(12) United States Patent
Bao et al.

(10) Patent No.: US 11,469,469 B2
(45) Date of Patent: *Oct. 11, 2022

(54) FIXING BAND FOR BATTERY MODULE AND BATTERY MODULE

(71) Applicant: Contemporary Amperex Technology Co., Limited, Ningde (CN)

(72) Inventors: Cong Bao, Ningde (CN); Chao Long, Ningde (CN); Chenzhi Lu, Ningde (CN); Peng Wang, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 51 days.

This patent is subject to a terminal disclaimer.

(21) Appl. No.: 17/082,062

(22) Filed: Oct. 28, 2020

(65) Prior Publication Data

US 2021/0043897 A1 Feb. 11, 2021

Related U.S. Application Data

(63) Continuation of application No. 16/299,239, filed on Mar. 12, 2019, now Pat. No. 10,862,085.

(30) Foreign Application Priority Data

Mar. 30, 2018 (CN) .......................... 201810298047.9

(51) Int. Cl.
*H01M 50/20* (2021.01)
*H01M 10/04* (2006.01)

(52) U.S. Cl.
CPC ....... *H01M 50/20* (2021.01); *H01M 10/0468* (2013.01); *H01M 10/0481* (2013.01)

(58) Field of Classification Search
None
See application file for complete search history.

(56) References Cited

U.S. PATENT DOCUMENTS

2019/0189982 A1* 6/2019 Lee ................. H01M 50/20

OTHER PUBLICATIONS https://sdyingli.en.made-in-china.com/product/TBxmPGIOvvWJ/China-Bead-Type-Reusable-Cable-Tie.html (Year: 2017).*

* cited by examiner

*Primary Examiner* — Carmen V Lyles-Irving
(74) *Attorney, Agent, or Firm* — East IP P.C.

(57) ABSTRACT

The disclosure relates to a fixing band for a battery module and a battery module. The fixing band comprises a first end portion, a connecting section and a second end portion which are arranged successively in an extending direction of the fixing band. The first end portion includes a body and engaging grooves which are protruded in a thickness direction of the body. The engaging grooves are integral with the body. The second end portion has engaging protrusions which are shaped to match the engaging grooves. The first end portion and the second end portion are laminated in the thickness direction and are engaged with each other by the engaging grooves and the engaging protrusions, so that the fixing band encloses an annular accommodation space.

9 Claims, 13 Drawing Sheets

FIXING BAND FOR BATTERY MODULE AND BATTERY MODULE

CROSS-REFERENCE TO RELATED APPLICATION

This application is a continuation of U.S. application Ser. No. 16/299,239 filed on Mar. 12, 2019, which claims priority to Chinese Patent Application No. 201810298047.9 filed on Mar. 30, 2018, the content of which are incorporated herein by reference in its entirety.

TECHNICAL FIELD

The disclosure relates to the technical field of battery, and in particular, to a fixing band for a battery module and a battery module.

BACKGROUND

In the conventional technology, the battery module generally comprises a battery stack which is formed by laminating a plurality of batteries and end plates which are disposed on two sides of the battery stack, wherein the end plates on the two sides are respectively welded and fixed to the two side plates to resist the expansion force from the batteries.

With the gradual improvement of the battery technology, the market demand for the battery module is continuously improved, and the non-module structure is developed. As compared with the battery module structure in the conventional technology, the called non-module structure removes the side plates connecting the two end plates. Due to the removal of the side plates, there is accordingly no connection between the side plates and the end plates to resist the expansion force from each battery. Therefore, in order to resist the expansion force from the batteries, the non-module structure usually employs a fixing band, which cooperates with the end plate to clamp the battery stack and resist the expansion force from the batteries.

However, due to the unreasonable design for the structure of the fixing band in the prior art, the fixing band has a complicated structure at the joint forming the closed ring body, it is not convenient to overlap, and has poor connection strength, and thus cannot meet the use requirements of the battery module.

Therefore, there is a need for a novel fixing band for the battery module and a battery module.

SUMMARY

The embodiments of the disclosure provide a fixing band for a battery module and a battery module, wherein the fixing band can be used for tightening the battery stack and the end plates to resist the expansion force from each battery. Further, the joint of the closed ring formed by the fixing band has a simple structure, is convenient to be overlapped, and has high connection strength, and therefore can meet the use requirements of the battery module.

In one aspect of an embodiment of the disclosure, a fixing band for a battery module is provided, comprising a first end portion, a connecting section and a second end portion which are arranged successively in an extending direction of the fixing band. The first end portion includes a body and engaging grooves which are protruded in a thickness direction of the body. The second end portion has engaging protrusions which are shaped to match the engaging grooves. The first end portion and the second end portion are laminated in the thickness direction and are engaged with each other by the engaging grooves and the engaging protrusions, so that the fixing band is configured to enclose an annular accommodation space.

According to one aspect of the embodiment of the disclosure, the engaging grooves have two or more and are spaced apart from each other on the first end portion in the extending direction, and the engaging protrusions have two or more and are spaced apart from each other on the second end portion in the extending direction.

According to one aspect of the embodiment of the disclosure, the engaging groove is formed by stamping the first end portion in the thickness direction, and the engaging protrusion is formed by stamping the second end portion in the thickness direction.

According to one aspect of the embodiment of the disclosure, a first clamping hole is formed between a groove wall of the engaging groove and the body of the first end portion, the first clamping hole penetrates through the groove wall of the engaging groove along a width direction of the fixing band, and the engaging protrusion of the second end portion has a first latching portion which is capable of extending to the first clamping hole to prevent the first end portion and the second end portion from being separated from each other.

According to one aspect of the embodiment of the disclosure, the second end portion comprises a main body and the engaging protrusions which are protruded in the thickness direction, a second clamping hole is formed between the engaging protrusion and the main body of the second end portion, the second clamping hole penetrates through a side wall of the engaging protrusion along a width direction of the fixing band, and the body of the first end portion has a second latching portion which is capable of extending to the second clamping hole.

According to one aspect of the embodiment of the disclosure, the groove wall of the engaging groove comprises an outer head portion, an outer connecting portion and an outer tail portion which are successively arranged in the extending direction, the outer connecting portion gradually increases in width from the outer head portion to the outer tail portion. Further, the engaging protrusion comprises an inner head portion, an inner connecting portion and an inner tail portion which are successively arranged in the extending direction, the inner connecting portion gradually increases in width from the inner head portion to the inner tail portion, and the first latching portion is located on the inner connecting portion.

According to one aspect of the embodiment of the disclosure, the outer connecting portion is connected to the outer head portion and the outer tail portion using a circular arc transition, and/or the inner connecting portion is connected to the inner head portion and the inner tail portion using a circular arc transition.

According to one aspect of the embodiment of the disclosure, in a width direction of the fixing band, the outer head portion has a width smaller than a width of the outer tail portion, the inner head portion has a width equal to the width of the outer head portion, at least a partial region of the inner connecting portion has a width greater than a width of a corresponding position of the outer connecting portion to the at least partial region, and the inner tail portion has a width equal to the width of the outer tail portion.

According to an aspect of the embodiment of the disclosure, the fixing band further comprises a stopping portion, which is provided at the first end portion and the second end portion to prevent the first end portion and the second end portion from being separated from each other.

According to one aspect of the embodiment of the disclosure, the stopping portion comprises a limiting hole which is provided at one of the first end portion and the second end portion, and a limiting protrusion which is provided at the other of the first end portion and the second end portion, and the limiting protrusion is received in the limiting hole and abuts against a hole wall of the limiting hole.

According to one aspect of the embodiment of the disclosure, the limiting protrusion is provided at the first end portion and is formed by stamping the first end portion; or, the limiting protrusion is provided at the second end portion and is formed by stamping the second end portion.

According to one aspect of the embodiment of the disclosure, each of the engaging grooves comprises a groove wall, the groove wall of each of the engaging grooves is separated from the body of the first end portion in a width direction of the fixing band The fixing band for the battery module according to the embodiment of the disclosure includes a first end portion, a connecting section and a second end portion which are arranged successively in an extending direction of the fixing band. The first end portion includes a body and engaging grooves which are protruded in a thickness direction of the body. The engaging grooves are integral with the body. The second end portion has engaging protrusions which are shaped to match the engaging grooves. The fixing band may be disposed to enclose the battery stack and the end plates of the battery module when applied into the battery module, so that the first end portion and the second end portion are laminated in the thickness direction of the body and are engaged with each other by the engaging grooves and the engaging protrusions. Therefore, the battery stack and the end plates are held and fixed within the accommodation space enclosed by the fixing band, and thus the fixing band can tighten the battery stack and the end plates and can withstand the expansion force from the batteries. Meanwhile, the joint of the fixing band employs the connection of engaging the engaging grooves integral with the body of the first end portion with the engaging protrusions provided at the second end portion, so the joint has a simple structure, is convenient to be overlapped, and has high connection strength, and therefore can meet the use requirements of the battery module.

In another aspect of the embodiment of the disclosure, a battery module is provided, comprising a battery stack, which includes a plurality of batteries which are stacked side by side; two end plates, which are spaced apart from each other and are disposed to hold the battery stack; and the above mentioned fixing band. The fixing band encloses the battery stack and the two end plates, and the first end portion and the second end portion are laminated in the thickness direction and are engaged with each other by the engaging grooves and the engaging protrusions, so that that the battery stack and the two end plates are held and fixed within the accommodation space.

BRIEF DESCRIPTION OF THE DRAWINGS

Features, advantages, and technical effects of exemplary embodiments of the disclosure will be described below with reference to the accompanying drawings.

In the drawings, the same reference numerals are used for the same parts. The figures are not drawn to the actual scale.

DETAILED DESCRIPTION

Figure 1:
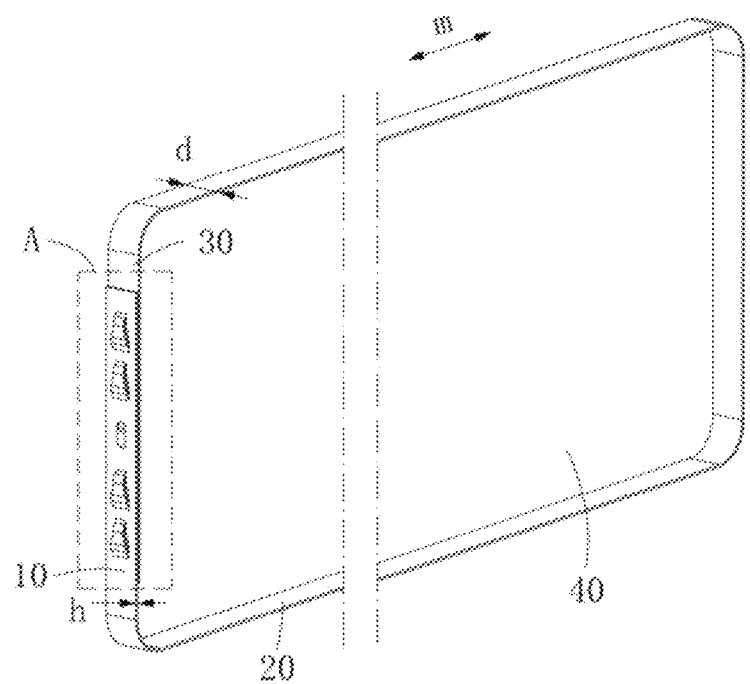
FIG. 1 shows an overall structural view of a fixing band for a battery module according to an embodiment of the disclosure.

Features and exemplary embodiments according to various aspects of the disclosure are described in detail below. In the following detailed description, numerous specific details are set forth to provide comprehensive understanding of the disclosure. However, it will be apparent to the skilled in the art that the disclosure may be practiced without some of the specific details. The following description of the embodiments is merely to provide a better understanding of the disclosure. In the figures and the following description, at least some of the known structures and techniques are not shown, to avoid unnecessarily obscuring the disclosure. Further, for clarity, the dimension of some of the structures may be enlarged. Furthermore, the features, structures, or characteristics described hereinafter may be combined in any suitable manner in one or more embodiments.

The orientation terms appearing in the following description refer to the directions shown in the drawings, and are not intended to limit the specific structure of the fixing band and the battery module of the disclosure. In the description of the disclosure, it should be noted that, unless otherwise stated, the terms "mount" and "connect" are to be understood broadly, for example, they may be fixed connection or detachable connection or integral connection; or may be direct connection or indirect connection. The specific meaning of the above terms in the disclosure may be understood by the skilled in the art based on the specific situation.

The fixing band provided in the embodiment of the disclosure is applied into the battery module and used in combination with the end plates of the battery module for holding and fixing the battery stack of the battery module and resisting the expansion force from each battery. The disclosure can meet the development trend of the non-module structure in the battery technology, and meantime can meet the use requirement of the battery module, since the joint has a simple structure, is convenient to be overlapped, and has high connection strength.

In order to better understand the disclosure, a fixing band 1 for a battery module and a battery module according to embodiments of the disclosure are described in detail with reference to FIGS. 1 to 14.

FIG. 1 shows an overall structural view of a fixing band 1 for a battery module according to an embodiment of the disclosure. As shown in FIG. 1, the fixing band 1 provided in the embodiment of the disclosure has a strip-like structure with a certain width and is made of a rigid material. The width of the fixing band 1 is not limited to a specific value, but may be determined according to the rigidity of the fixing band 1 and the number of batteries required to withstand the expansion force. The rigid material may be metal, alloy, or the like.

Figure 2:
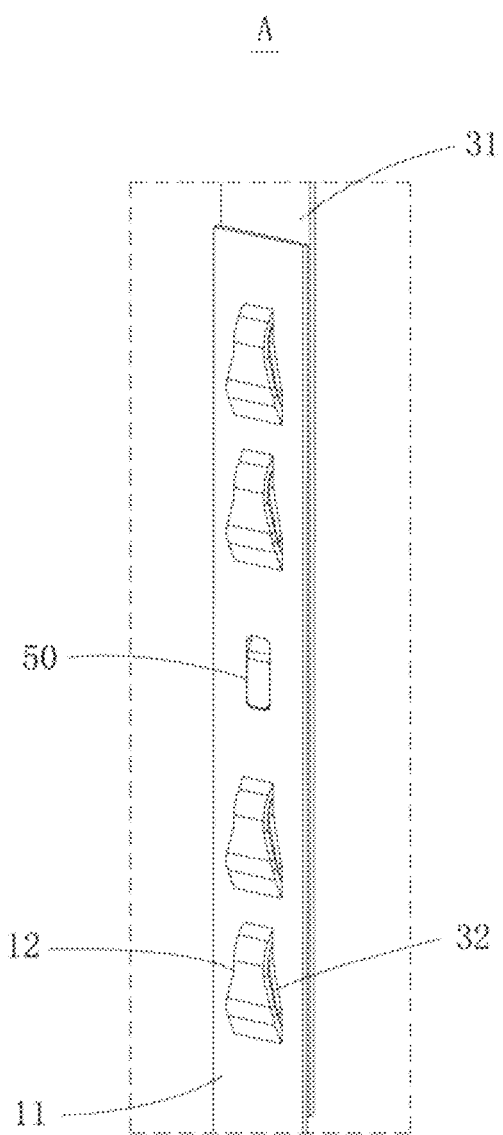
FIG. 2 shows an enlarged view of a portion A in FIG. 1.
Figure 3:
FIG. 3 shows a partial structural view of a first end portion according to an embodiment of the disclosure.

FIG. 2 shows an enlarged view of a portion A in FIG. 1, and FIG. 3 shows a partial structural view of the first end portion 10 according to an embodiment of the disclosure. As shown in FIGS. 2 and 3, the fixing band 1 comprises a first end portion 10, a connecting section 20 and a second end portion 30, which are arranged successively in an extending direction m of the fixing band 1. The first end portion 10, the connecting section 20 and the second end portion 30 are integral and have the same width. The first end portion 10 includes a body 11 and engaging grooves 12 which are formed in a thickness direction h of the body 11. The engaging grooves 12 are integral with the body 11. The second end portion 30 has engaging protrusions 32 which are shaped to match the engaging grooves 12. The first end portion 10 and the second end portion 30 are laminated in the thickness direction h and are engaged with each other by the engaging grooves 12 and the engaging protrusions 32, so that the fixing band 1 encloses an annular accommodation space 40.

The engaging groove 12 of the first end portion 10 may be formed by welding, casting and machining, or the like. However, the engaging groove 12 of the first end portion 10 is preferably formed by stamping the first end portion 10 in the thickness direction h of the body 11. The engaging groove 12 is formed by stamping. Particularly, the engaging groove 12 is formed, by firstly scribing and cutting the first end portion 10 at a position where the engaging groove 12 is required according to the shape of the engaging groove 12, so that the groove wall of the engaging groove 12 is separated from the body 11 of the first end portion 10 in the width direction d of the fixing band 1, and then stamping the scribed position of the first end portion 10 in the thickness direction h.

Figure 4:
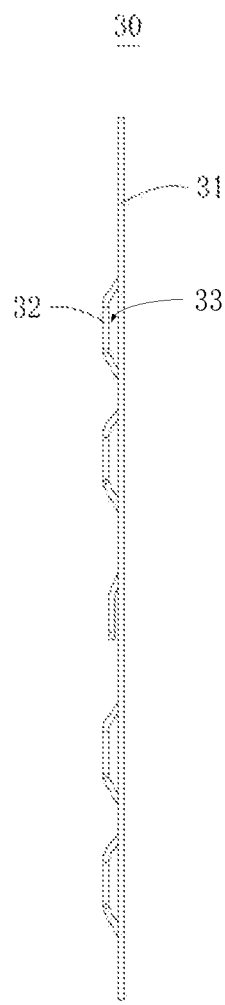
FIG. 4 shows a partial structural view of a second end portion according to an embodiment of the disclosure.

FIG. 4 shows a partial structural view of a second end portion according to an embodiment of the disclosure. As shown in FIG. 4, the second end portion 30 includes a main body 31 which is laminated with the first end portion 10 and the engaging protrusions 32 which are engaged with the engaging grooves 12. The main body 31 is integral with the engaging protrusions 32. The engaging protrusion 32 of the second end portion 30 may be formed in the same manner as that of the engaging groove 12, that is, may be formed by welding, casting and machining, or the like. However, the engaging protrusion 32 of the second end portion 30 is preferably stamping the second end portion 30 in the thickness direction h of the main body 31. Particularly, the engaging protrusion 32 is formed, by firstly scribing and cutting the second end portion 30 at a position where the engaging protrusion 32 is required according to the shape of the engaging protrusion 32, so that a part of the engaging protrusion 32 is separated from the body 11 of the second end portion 30 in the width direction d of the fixing band 1, and then stamping the scribed position of the second end portion 30 in the thickness direction h.

After the engaging protrusion 32 and the engaging groove 12 are formed, the corresponding positions of the fixing band 1 may be bent according to use requirements, so that the body 11 of the first end portion 10 and the main body 31 of the second end portion 30 are laminated with each other, and the engaging groove 12 and the engaging protrusion 32 are engaged with each other to form an overlap joint as shown in FIG. 2.

The engaging grooves 12 are integral with the body 11, and the engaging protrusion 32 are integral with the main body 31, therefore, it is easy to process and overlap the first end portion 10 and the second end portion 30. Meanwhile, the engaging grooves 12 protrude in the thickness direction h of the body 11, and the engaging protrusions 32 are formed in the thickness direction h of the main body 31. Of course, the thickness direction h of the body 11 coincides with the thickness direction h of the main body 31. Through the force analysis, the engaging protrusions 32 and the engaging grooves 12 provided in the embodiment of the disclosure, when subjected to the expansion force from the batteries after are engaged with each other, as compared with the arrangement of the connecting piece applied at the two free end portions of the steel strip, it is not only easy to process, assemble, and cost-effective, but it is also possible to make the connection strength between the two free end portions (i.e., the first end portion 10 and the second end portion 30) higher. Therefore, the connection strength between the two free end portions is not easily detached or broken.

Figure 5:
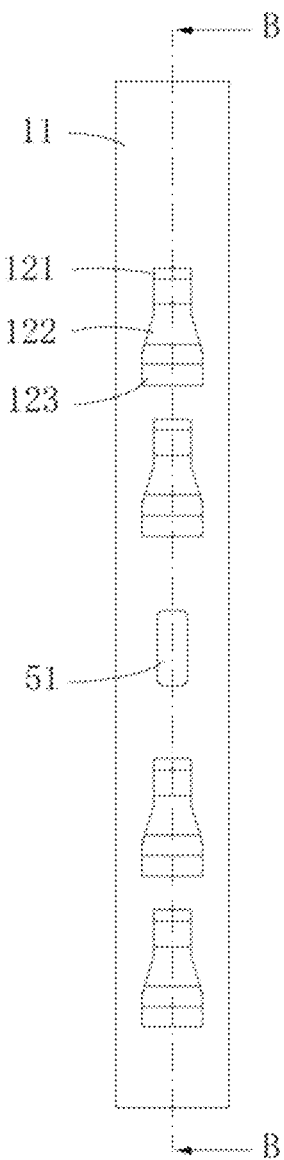
FIG. 5 shows a front view of the structure shown in FIG. 3.
Figure 6:
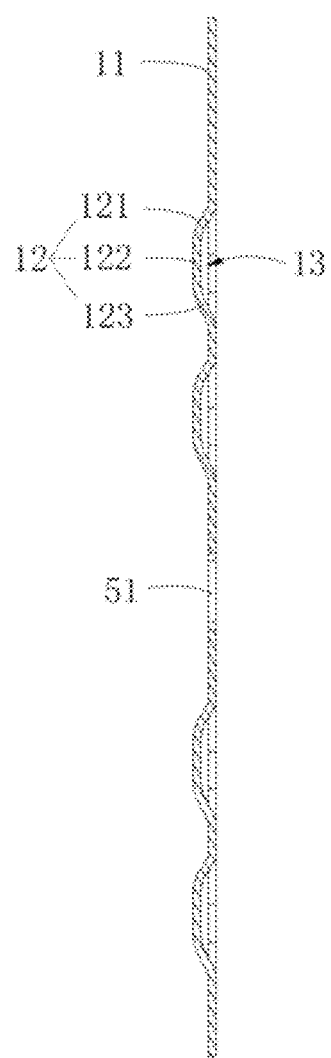
FIG. 6 shows a cross-sectional view taken along the direction B-B in FIG. 5.

FIG. 5 shows a front view of the structure shown in FIG. 3, and FIG. 6 shows a cross-sectional view taken along the direction B-B in FIG. 5. As shown in FIGS. 5 and 6, as an alternative embodiment, the body 11 of the first end portion 10 has a strip-like structure with a certain width and is provided with openings corresponding to the engaging grooves 12. The groove wall of the engaging groove 12 comprises an outer head portion 121, an outer connecting portion 122 and an outer tail portion 123 which are successively arranged in the extending direction m. The outer head portion 121 and the outer tail portion 123 each has a strip-like structure of equal width in the extending direction m. The outer connecting portion 122 gradually increases in width from the outer head portion 121 to the outer tail portion 123, and has a trapezoidal structure. The engaging groove 12 is formed by connecting the groove wall of the engaging groove 12 to the body 11 by the end portion surfaces of the outer head portion 121 and the outer tail portion 123 respectively.

In order to avoid stress concentration at the connection of the outer connecting portion 122 with the outer head portion 121 and the outer tail portion 123 respectively, as an alternative embodiment, the outer connecting portion 122 is connected with the outer head portion 121 and the outer tail portion 123 using a circular arc transition. Therefore, stress concentration is avoided, and rigidity and service life of the fixing band 1 are ensured.

Figure 7:
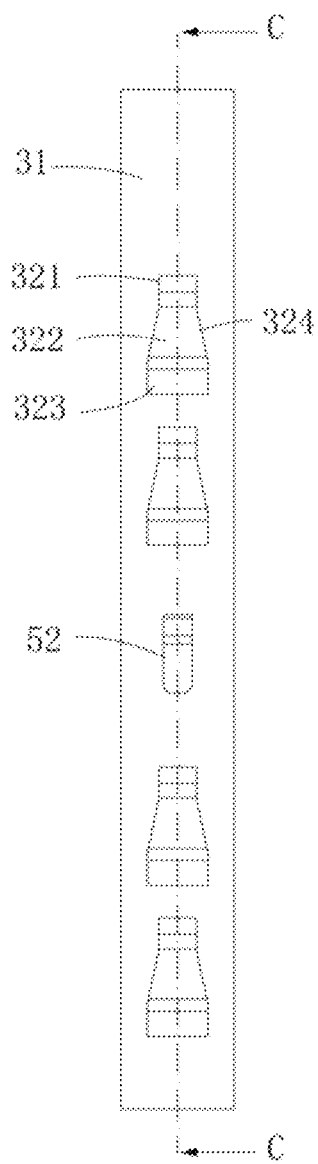
FIG. 7 shows a front view of the structure shown in FIG. 4.
Figure 8:
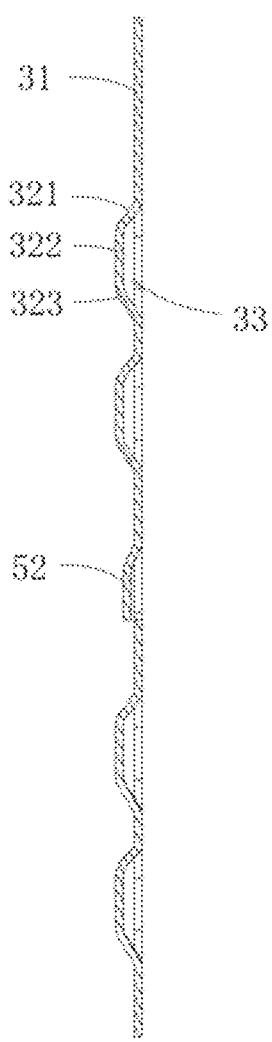
FIG. 8 shows a cross-sectional view taken along the direction C-C in FIG. 7.

FIG. 7 shows a front view of the structure shown in FIG. 4, and FIG. 8 shows a cross-sectional view taken along the direction C-C in FIG. 7. As shown in FIGS. 7 and 8, as an alternative embodiment, the main body 31 of the second end portion 30 has substantially the same structure as the body 11 of the first end portion 10. In other words, the main body 31 of the second end portion 30 also has a strip-like structure with a certain width and is provided with openings corresponding to the engaging protrusions 32. The engaging protrusion 32 includes an inner head portion 321, an inner connecting portion 322 and an inner tail portion 323 which are successively arranged in the extending direction m. The inner head portion 321 and the inner tail portion 323 each has a strip-like structure of equal width in the extending direction m. The inner connecting portion 322 gradually increases in width from the inner head portion 321 to the inner tail portion 323, and has a trapezoidal structure as a whole.

In order to avoid stress concentration at the connection of the inner connecting portion 322 with the inner head portion 321 and the inner tail portion 323, as an alternative embodiment, the inner connecting portion 322 is connected to the inner head portion 321 and the inner tail portion 323 using a circular arc transition. Therefore, stress concentration is avoided, and rigidity and service life of the fixing band 1 are ensured.

Figure 9:
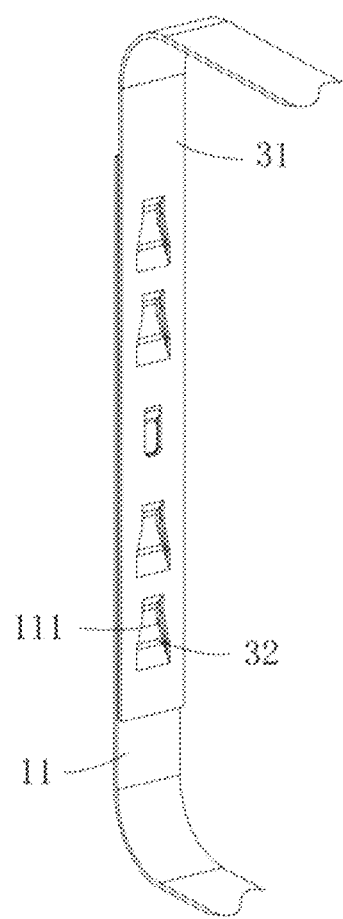
FIG. 9 shows a partial structural view of the first end portion engaging with the second end portion.
Figure 10:
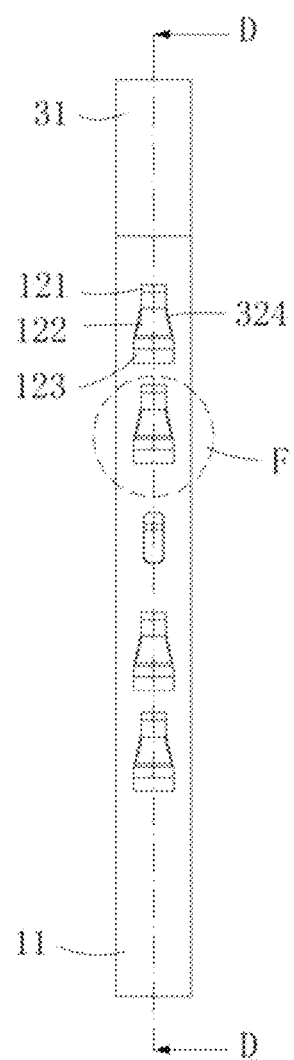
FIG. 10 shows a front view of FIG. 9.
Figure 11:
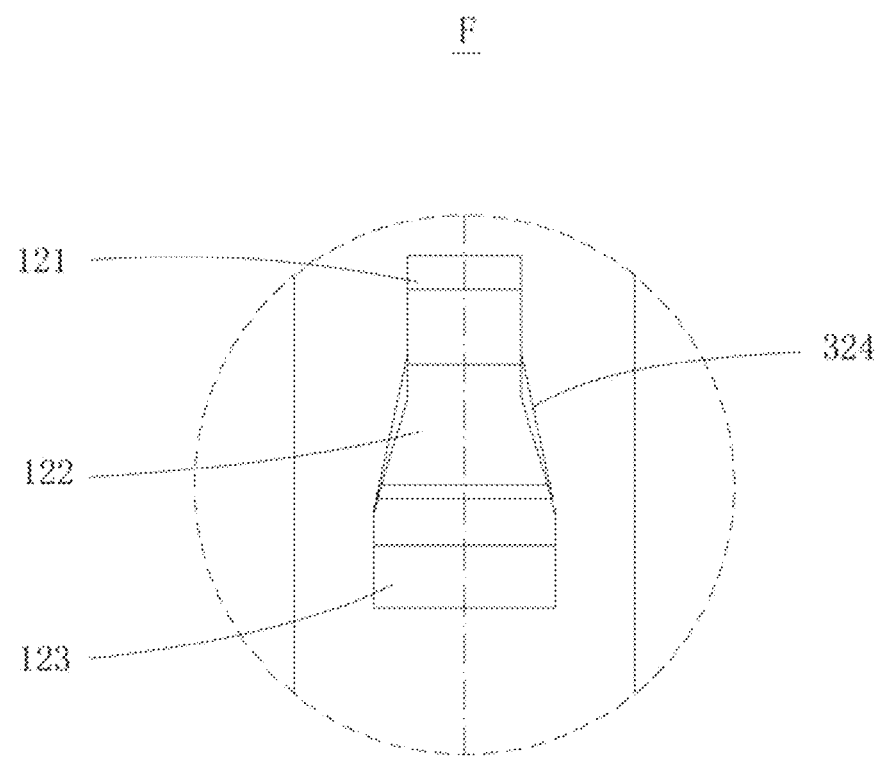
FIG. 11 shows an enlarged view of a portion F in FIG. 10.
Figure 12:
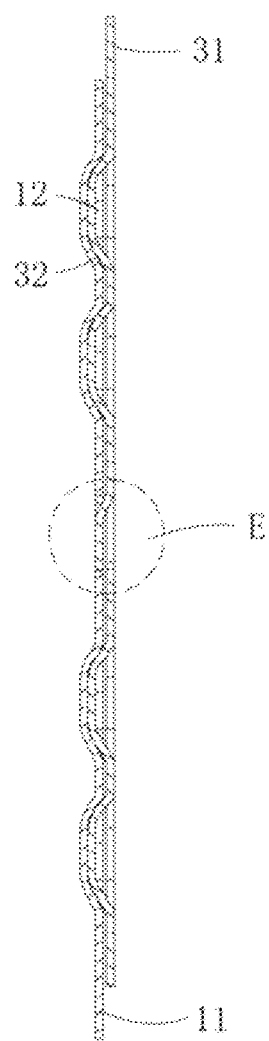
FIG. 12 shows a cross-sectional view taken along the direction D-D in FIG. 10.

FIG. 9 shows a partial structural view of the first end portion engaging with the second end portion. FIG. 10 shows a front view of FIG. 9. FIG. 11 shows an enlarged view of a portion F in FIG. 10. FIG. 12 shows a cross-sectional view taken along the direction D-D in FIG. 10.

In order to further prevent the first end portion 10 and the second end portion 30 from separating from each other in the thickness direction h and to ensure the connection strength of the first end portion 10 and the second end portion 30, as an alternative embodiment, a first clamping hole 13 is formed between the groove wall of the engaging groove 12 and the body 11 of the first end portion 10. The first clamping hole 13 penetrates through the groove wall of the engaging groove 12 along the width direction d. The engaging protrusion 32 has a first latching portion 324 capable of extending to the first clamping hole 13. In this embodiment, the first latching portion 324 is provided at the inner connecting portion 322 of the engaging protrusion 32. When the engaging groove 12 and the engaging protrusion 32 are engaged with each other, the first latching portion 324 extends to the first clamping hole 13, so that the movement of the first end portion 10 and the second end portion 30 are limited in the thickness direction h so as to prevent the first end portion 10 and the second end portion 30 from separating from each other in the thickness direction h.

More preferably, a second clamping hole 33 is formed between the engaging protrusion 32 of the second end portion 30 and the main body 31 of the second end portion 30. The second clamping hole 33 penetrates through a side wall of the engaging protrusion 32 along the width direction d. The body 11 has a second latching portion 111 capable of extending to the second clamping hole 33. That is, with the above arrangement, the groove wall of the engaging groove 12 of the first end portion 10 and the body 11, and the engaging protrusion 32 of the second end portion 30 and the main body 31 are arranged successively and laminated with each other in the thickness direction h. Therefore, the first end portion 10 and the second end portion 30 can not only be prevented from separating from each other in the thickness direction h, and the first end portion 10 and the second end portion 30 can also be prevented from detaching from each other toward the direction away from each other in the extending direction m of the entire fixing band 1. The above and the following term "the direction away from each other" refers to the direction in which the first end portion 10 and the second end portion 30 are separated from each other so that the annular accommodation space 40 enclosed by the fixing band 1 is opened.

In order to provide guidance when the first end portion 10 and the second end portion 30 are assembled with each other and to limit movement of the first end portion 10 and the second end portion 30 toward the direction away from each other, as an alternative embodiment, in the width direction d of the entire fixing band 1, the outer head portion 121 has a width smaller than the width of the outer tail portion 123, the inner head portion 321 has a width equal to the width of the outer head portion 121. At least a partial region of the inner connecting portion 322 has a width larger than the width of a corresponding position of the outer connecting portion 122 to the at least a partial region of the inner connecting portion 322. The corresponding position refers to a position where the inner connecting portion 322 and the outer connecting portion 122 are laminated relative to each other when the first end portion 10 and the second end portion 30 are laminated with each other in the thickness direction h. With the above arrangement, when the first end portion 10 and the second end portion 30 overlap each other, they are laminated in advance, and the orientation of the outer head portion 121 is the same as that of the inner head portion 321, and then the second end portion 30 is pulled, so that the inner head portion 321, the inner connecting portion 322 and the inner tail portion 323 of the second end portion 30 are sequentially slid into the outer head portion 121, the outer connecting portion 122 and the outer tail portion 123. Meanwhile, the first latching portion 324 enters the first clamping hole 13, and the second latching portion 111 enters the second clamping hole 33, so that when the fixing band 1 is subjected to the expansion force from the batteries after applied into the battery module, the outer head portion 121 of the first end portion 10 can limit the movement of the inner connecting portion 322 of the second end portion 30 to hold the inner connecting portion 322. Therefore, the first end portion 10 and the second end portion 30 are prevented from moving away from each other in the extending direction m.

Preferably, in the width direction d, the width of all the regions of the inner connecting portion 322 is larger than the width of the corresponding position of the outer connecting portion 122 to all the regions of the inner connecting portion 322. Therefore, the connection strength requirements between the first end portion 10 and the second end portion 30 can be ensured well.

The engaging grooves 12 on the first end portion 10 provided in the embodiment of the disclosure have four and are spaced apart from each other. The engaging protrusions 32 on the second end portion 30 have the same number as the engagement grooves 12 on the first end portion 10 and are spaced apart from each other on the second end portion 30. Each engaging groove 12 and each engaging protrusion 32 correspond to each other. However, the arrangement is not limited to the described above. In some alternative embodiments, depending on the specific circumstances, the number of engaging grooves 12 and engaging protrusions 32 may be less than four (for example two) or more than four (for example five, six, or even more). Meanwhile, the number of the engaging grooves 12 and the number of the engaging protrusions 32 are not limited to the same, and may be different, for example, the number of the engaging grooves 12 may be larger than the number of the engaging protrusions 32, so that the fixing band 1 can adjust the engaging grooves 12 matching with the engaging protrusions 32 according to the specification and model of the battery module in which the fixing band is applied. Therefore, the fixing band 1 can be applied into a plurality of battery modules of different specifications, so that the fixing band 1 has a wider use range.

In the present embodiment, the outer head portion 121 of each engaging groove 12 on the first end portion 10 faces the side of the first end portion 10 remote from the connecting section 20, and the inner portion 321 of each engaging protrusion 32 on the second end portion 30 faces the side of the second end portion 30 near the connecting section 20. After the four engaging protrusions 32 are engaged with the four engaging grooves 12, the first end portion 10 and the second end portion 30 can be prevented from being separated from each other.

Figure 13:
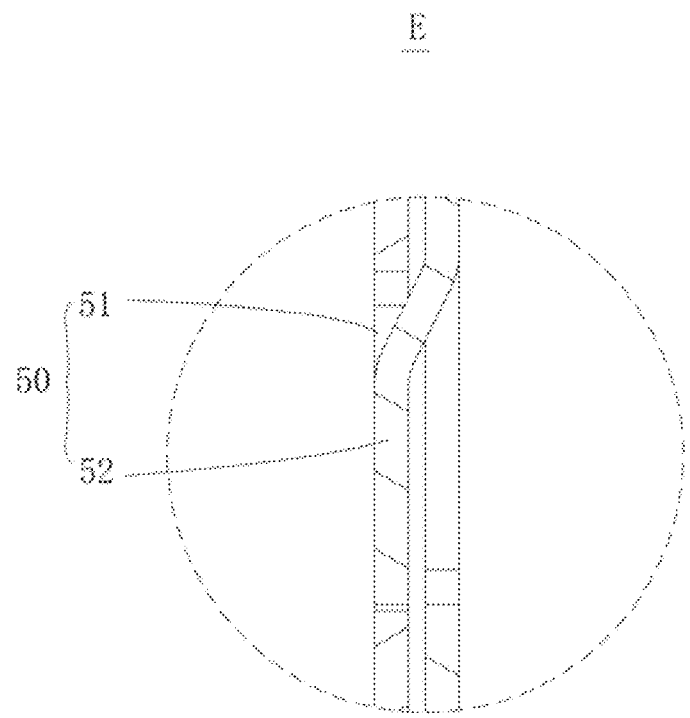
FIG. 13 shows an enlarged view of a portion E in FIG. 12.

FIG. 13 shows an enlarged view of a portion E in FIG. 12. Since the orientations of the outer head portions 121 of the four engaging grooves 12 on the first end portion 10 are same, and the orientations of the inner head portions 321 of the four engaging protrusions 32 on the second end portion 30 are same, it is possible to provide a limiting for the first end portion 10 and the second end portion 30 toward the direction away from each other. In order to prevent the first end portion 10 and the second end portion 30 from moving toward the direction near to each other in the extending direction m due to incorrect operation of the operator during assembly or handling, thereby causing the engaging groove 12 and the engaging protrusion 32 to be separated from each other, as an alternative embodiment, the fixing band 1 further comprises a stopping portion 50, as shown in FIG. 13. The stopping portion 50 is provided at the first end portion 10 and the second end portion 30, to prevent the first end portion 10 and the second end portion 30 from being separated from each other, and particularly, to prevent the first end portion 10 and the second end portion 30 from moving toward the direction near to each other. Therefore, the first end portion 10 and the second end portion 30 are limited in all directions after being overlapped with each other, and thereby the connection between the first end portion 10 and the second end portion 30 is more stable.

In the present embodiment, the stopping portion 50 includes a limiting hole 51, which is provided at the first end portion 10, and a limiting protrusion 52, which is provided at the second end portion 30. The outer contour shape of the limiting protrusion 52 is shaped to match the outer contour shape of the limiting hole 51. The limiting protrusion 52 can be received in the limiting hole 51 and abut against the hole wall of the limiting hole 51, so as to limit the relative movement of the first end portion 10 and the second end portion 30 in the extending direction m (i.e., in the thickness direction h).

The limiting hole 51 in the first end portion 10 may be formed by various processes, such as by machining, preferably by stamping. The limiting protrusion 52 may be formed by welding a protrusion onto the second end portion 30, of course, preferably by stamping. Particularly, a U-shaped groove portion is cut firstly in the main body 31 of the second end portion 30, the cut U-shaped groove portion is opposed to the limiting hole 51, and then the U-shaped groove portion is stamped. The formed protrusion is the limiting protrusion 52 and may enter the limiting hole 51. Therefore, the limiting protrusion 52 together with the engaging groove 12 and the engaging protrusion 32 can further improve the connection strength of the first end portion 10 and the second end portion 30.

It is understood that the limiting hole 51 is not limited to be provided at the first end portion 10, and the limiting protrusion 52 is not limited to be provided at the second end portion 30. In some alternative embodiments, the limiting hole 51 may be provided at the second end portion 30 and the limiting protrusion 52 may be provided at the first end portion 10. This arrangement can also play the corresponding limiting function, and may be formed by stamping, which will not be described here.

Meanwhile, it is understood that the stopping portion 50 is not limited to the form of the limiting hole 51 and the limiting protrusion 52, however, the structure which can cooperate with the engaging groove 12 and the engaging protrusion 32 to limit the movement of the first end portion 10 and the second end portion 30 is applicable. For example, rivets may also be used.

In order to facilitate manufacture and installation, in the embodiment of the disclosure, the orientations of the outer head portions 121 of the four engaging grooves 12 on the first end portion 10 are provided to be the same, and the orientations of the inner head portions 321 of the four engaging protrusions 32 on the second end portion 30 are provided to be the same, and accordingly, the stopping portion 50 is provided. Of course, the engaging protrusion 32 and the engaging groove 12 may be assembled in other manners. In the case where the engaging groove 12 and the engaging protrusion 32 are integral and engaged with each other, the stopping portion 50 may not be provided. For example, the orientations of the outer head portions 121 and the inner head portions 321 of one or more groups of the engaging grooves 12 and the engaging protrusions 32 are opposite to the orientations of the outer head portions 121 and the inner head portions 321 of other groups of the engaging grooves 12 and the engaging protrusions 32. In such case, movement of the first end portion 10 and the second end portion 30 can be limited in the direction away from each other and/or in the direction near to each other by the engagement of the engaging groove 12 and the engaging protrusion 32.

In this way, the fixing band 1 for the battery module provided in the embodiment of the disclosure may be disposed to enclose the battery stack and the end plates of the battery module when applied into the battery module, so that the first end portion 10 and the second end portion 30 are laminated in the thickness direction h of the body 11 and are engaged with each other by the engaging grooves 12 and the engaging protrusions 32. Therefore, the battery stack and the end plates are held and fixed within the accommodation space 40 enclosed by the fixing band 1, and thus the fixing band 1 can tighten the battery stack and the end plates and can withstand the expansion force from the batteries. Meanwhile, since the joint of the fixing band 1 employs the connection of engaging the engaging groove 12 integral with the body 11 of the first end portion 10 with the engaging protrusion 32 provided at the second end portion 30, the joint has a simple structure, is convenient to be overlapped, and has high connection strength. Further, the shape of the engaging groove 12 and the corresponding engaging protrusion 32 and the arrangement of the stopping portion 50 make the connection strength of the first end portion 10 and the second end portion 30 higher. Therefore, the use requirements of the battery module can be met.

Figure 14:
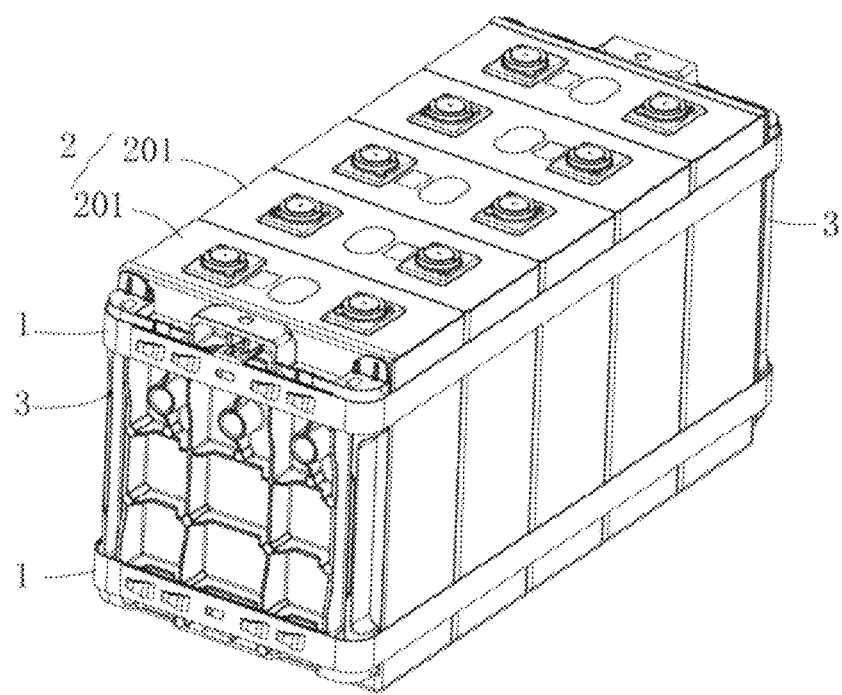
FIG. 14 shows a schematic structural view of a battery module according to an embodiment of the disclosure.

FIG. 14 is a schematic structural view of a battery module according to an embodiment of the disclosure. As shown in FIG. 14, the battery module provided in the embodiment of the disclosure includes a battery stack 2, two end plates 3, and a fixing band 1 according to the above embodiments. The battery stack 2 includes a plurality of batteries 201 which are stacked side by side. The two end plates 3 are disposed to be spaced apart from each other and to sandwich the battery stack 2. The fixing band 1 is disposed to enclose the battery stack 2 and the two end plates 3. The first end portion 10 and the second end portion 30 are laminated in the thickness direction h and engaged with each other by the engaging grooves 12 and the engaging protrusions 32, so that the battery stack 2 and the two end plates 3 are sandwiched and fixed within the accommodation space 40.

The battery module provided in the embodiment of the disclosure includes the fixing band 1 provided in any of the above embodiments, so it can cooperate with the two end plates 3 to resist the expansion force from each battery 201 in the battery stack 2. Further, the fixing band 1 is easily assembled, has high connection strength, and therefore, the safety performance and the service life of the battery module are improved.

Although the disclosure has been described with reference to preferred embodiments, various modifications may be made and components therein may be replaced with equivalents without departing from the scope of the disclosure. In particular, the technical features mentioned in the various embodiments may be combined in any manner as long as there is no structural conflict. The disclosure is not limited to the specific embodiments disclosed herein, but includes all technical solutions falling within the scope of the claims.

REFERENCE NUMERALS m extending direction
h thickness direction
d width direction
1 fixing band
10 first end portion
11 body
111 second latching portion
12 engaging groove
121 outer head portion
122 outer connecting portion
123 outer tail portion
13 first clamping hole
20 connecting section
30 second end portion
31 main body
32 engaging protrusion
321 inner head portion
322 inner connecting portion
323 inner tail portion
324 first latching portion
33 second clamping hole
40 accommodation space
50 stopping portion
51 limiting hole
52 limiting protrusion
2 battery stack
201 battery
3 end plate

What is claimed is:

1. A fixing band for a battery module, comprising a first end portion, a connecting section and a second end portion which are arranged successively in an extending direction of the fixing band, wherein
    the first end portion includes a body and engaging grooves which are protruded in a thickness direction of the body, each of the engaging grooves comprises a groove wall, the groove wall of each of the engaging grooves is separated from the body of the first end portion in a width direction of the fixing band, and
    the second end portion has engaging protrusions which are shaped to match the engaging grooves, and the first end portion and the second end portion are stacked in the thickness direction and are engaged with each other in a manner that the engaging protrusions are accommodated within the engaging grooves and are engaged with the groove walls of the engaging grooves, so that the fixing band is configured to enclose an annular accommodation space, wherein
    a first clamping hole is formed between the groove wall of the engaging groove and the body of the first end portion, the first clamping hole is a through hole which is penetrated along the width direction of the fixing band, and the engaging protrusion of the second end portion has a first latching portion which is capable of extending to the first clamping hole to prevent the first end portion and the second end portion from being separated from each other;
    the second end portion comprises a main body and the engaging protrusions which are protruded in the thickness direction, a second clamping hole is formed between the engaging protrusion and the main body of the second end portion, the second clamping hole is a through hole which is penetrated along the width direction of the fixing band, and the body of the first end portion has a second latching portion which is capable of extending to the second clamping hole;
    the groove wall of the engaging groove comprises an outer head portion, an outer connecting portion and an outer tail portion which are successively arranged in the extending direction, the outer connecting portion gradually increases in width from the outer head portion to the outer tail portion; and
    the engaging protrusion comprises an inner head portion, an inner connecting portion and an inner tail portion which are successively arranged in the extending direction, the inner connecting portion gradually increases in width from the inner head portion to the inner tail portion, and the first latching portion is located on the inner connecting portion.

2. The fixing band according to claim 1, wherein the engaging grooves have two or more and are spaced apart from each other on the first end portion in the extending direction, and the engaging protrusions have two or more and are spaced apart from each other on the second end portion in the extending direction.

3. The fixing band according to claim 1, wherein the engaging groove is formed by stamping the first end portion in the thickness direction, and the engaging protrusion is formed by stamping the second end portion in the thickness direction.

4. The fixing band according to claim 1, wherein the outer connecting portion is connected to the outer head portion and the outer tail portion using a circular arc transition, and/or the inner connecting portion is connected to the inner head portion and the inner tail portion using a circular arc transition.

5. The fixing band according to claim 1, wherein in the width direction of the fixing band, the outer head portion has a width smaller than a width of the outer tail portion, the inner head portion has a width equal to the width of the outer head portion, at least a partial region of the inner connecting portion has a width greater than a width of a corresponding position of the outer connecting portion to the at least partial region, and the inner tail portion has a width equal to the width of the outer tail portion.

6. The fixing band according to claim 1, wherein the fixing band further comprises a stopping portion, which is provided at the first end portion and the second end portion to prevent the first end portion and the second end portion from being separated from each other.

7. The fixing band according to claim 6, wherein the stopping portion comprises a limiting hole which is provided at one of the first end portion and the second end portion, and a limiting protrusion which is provided at the other of the first end portion and the second end portion, and the limiting protrusion is received in the limiting hole and abuts against a hole wall of the limiting hole.

8. The fixing band according to claim 7, wherein the limiting protrusion is provided at the first end portion and is formed by stamping the first end portion; or, the limiting protrusion is provided at the second end portion and is formed by stamping the second end portion.

9. A battery module, comprising:
- a battery stack, which includes a plurality of batteries which are stacked side by side;
- two end plates, which are spaced apart from each other and are disposed to hold the battery stack; and
- the fixing band according to claim 1,
- wherein the fixing band encloses the battery stack and the two end plates, and the first end portion and the second end portion are stacked in the thickness direction and are engaged with each other in a manner that the engaging protrusions are accommodated within the engaging grooves and are engaged with the groove walls of the engaging grooves, so that that the battery stack and the two end plates are held and fixed within the annular accommodation space.

* * * * *